Aug. 2, 1960
E. H. ODDSON
2,947,550
COUPLING MECHANISM FOR VEHICLE
Filed Aug. 19, 1957
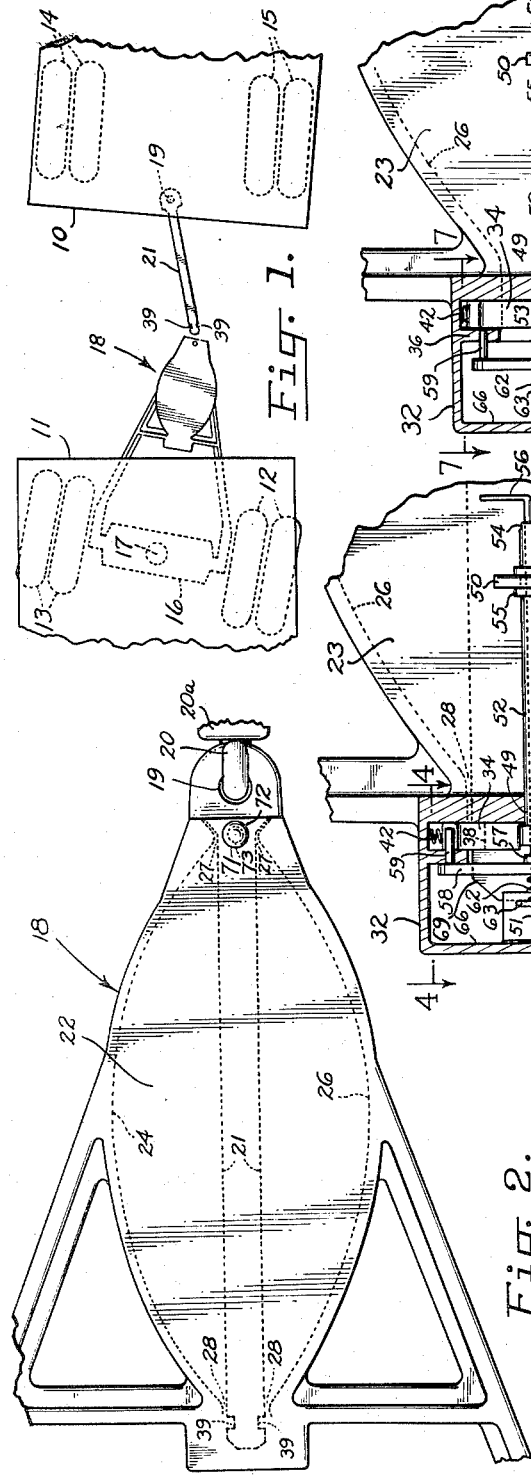
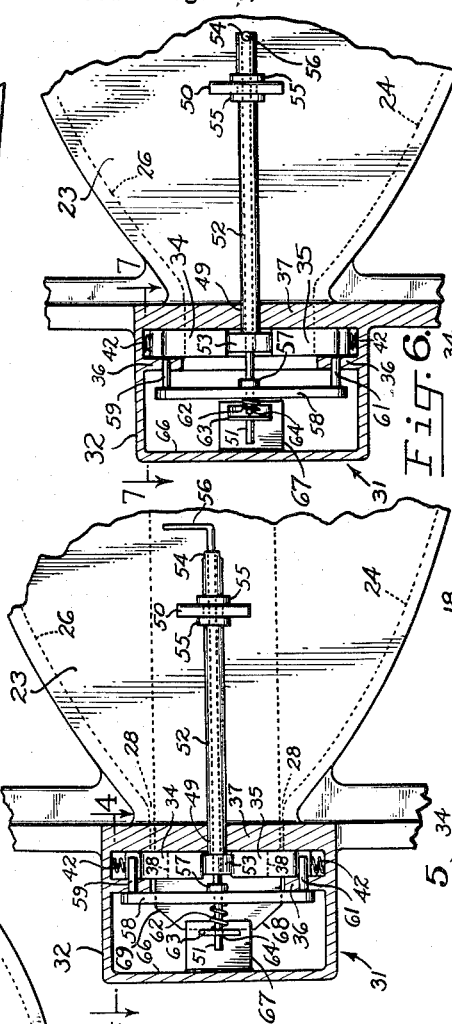
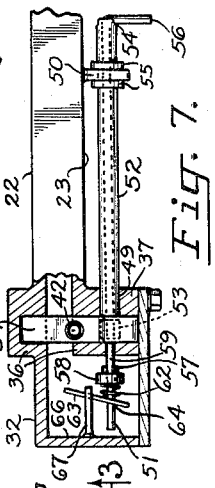
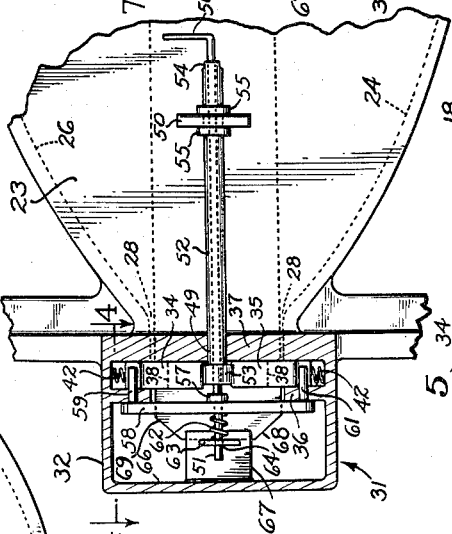
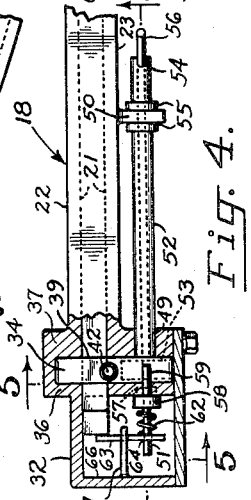
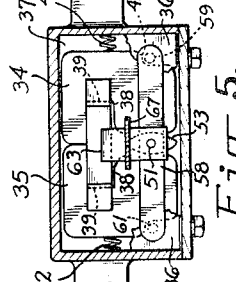
INVENTOR.
Elmer H. Oddson
BY
Ramsey and Kolisch
Attys.

United States Patent Office 2,947,550
Patented Aug. 2, 1960

2,947,550

COUPLING MECHANISM FOR VEHICLE

Elmer H. Oddson, 13324 NE. Glisan St., Portland, Oreg.

Filed Aug. 10, 1957, Ser. No. 678,875

1 Claim. (Cl. 280—477)

This invention relates to detachable coupling mechanism for a pair of vehicles, and more particularly to novel vehicle coupling mechanism wherein the tongue member by which the vehicles are connected together is detachably connected at each of its ends to each one of the vehicles, respectively. One end of the tongue member carries a portion of the coupler device normally used in connecting a pair of vehicles. The other end of the tongue member is separable from but detachably locked in mounting structure secured to one of the vehicles. In most instances, this mounting structure will be part of the trailing vehicle, the tongue member extending forwardly of the vehicle. By including a guide means in this mounting structure, aligning and coupling of the vehicles is greatly facilitated. The guide structure functions to assist in aligning the vehicles thereby to eliminate extensive maneuvering. The invention relates to and is an improvement upon the mechanism disclosed in my copending application entitled "Vehicle Coupling Mechanism," Serial Number 639,302, filed February 11, 1957, now abandoned.

This invention features, in conjunction with the detachable tongue member and cooperating mounting structure, a novel locking mechanism whereby the tongue member is secured from longitudinal movement relative to the mounting structure. The locking mechanism prevents separation of the tongue member and mounting structure when a draft connection is established and a load is drawn.

The locking mechanism securing the tongue member in position must meet a number of requirements if it is to perform satisfactorily. For instance, the mechanism should be sturdy, and produce a connection which remains fast under the severest type of operating conditions. In a truck-train combination, considerable stresses are imparted to any tongue member interposed between the vehicles during the transit of a load, and it is important that the locking mechanism not fail under these stresses. Further, the locking mechanism should produce a fairly rigid connection order that shifting movement between the various parts be reduced to a minimum.

Included in the lock mechanism are a pair of locking members which come together to engage and positively to lock the tongue member from movement longitudinally of the mounting structure. A catch member moves into engagement with the locking members after they have latched onto the tongue member and fixes the locking members from shifting out of engagement with the tongue member. The catch member contributes to the rigidity in the connection, and, in addition, constitutes an important safety factor.

The locking mechanism is readily adjusted to release the tongue member when desired. Further a means is included in the locking mechanism for holding the catch member from moving into engagement with the locking members after the tongue member is removed, facilitating the subsequent insertion of the tongue member into the locking mechanism when the tongue member is re-secured in place. The locking mechanism is released without the removal of any parts which might become lost.

In one embodiment of this invention, a pair of locking mechanisms are employed to secure the tongue member in position. These are spaced along the length of the tongue member. This is to provide insurance against separation of the tongue member from the mounting structure. Further, the use of a pair of spaced locking mechanisms increases the over-all rigidity of the connection. To facilitate assembly of the tongue member and mounting structure, the locking mechanisms are placed on either side, respectively, of the guide means in the mounting structure, enabling the lead end of the tongue member to move freely through the guide structure during alignment of the parts.

Other objects, advantages, and related features are attained by the present invention, the invention being described hereinbelow in conjunction with the accompanying drawings, wherein:

Fig. 1 is a top view, in simplified form, of portions of a truck-train combination, showing the coupling mechanism of this intervention interposed between the units and showing the parts out of alignment;

Fig. 2 is an enlarged view of the coupling mechanism, the parts in the figure occupying an aligned position;

Fig. 3 is a view, partly in section, of the rear portion of the coupling mechanism and illustrating the lock mechanism employed;

Fig. 4 is a section view along the line 4—4 in Fig. 3;

Fig. 5 is a section view along the line 5—5 in Fig. 4;

Fig. 6 is a view similar to Fig. 3 but showing illustrated the parts of the lock mechanism in a different position; and Fig. 7 is a section view along the line 7—7 in Fig. 6.

Referring now to the drawings for a detailed description of one embodiment of the invention, and more particularly to Figs. 1 and 2, the coupling mechanism is shown incorporated in a truck-train combination, the train including a leading or drawing vehicle 10 and a trailing or drawn vehicle 11. Vehicles 10 and 11 are conventional, each having support wheels such as wheel pairs 12, 13, 14 and 15. Wheel pairs 12 and 13 supporting the forward end of trailing vehicle 11 are mounted at opposite ends of a swivel carriage structure indicated at 16 and are dirigible wheel pairs. Carriage structure 16 is pivotable about axis 17. The forward A-frame portion of the carriage constitutes a draft tongue for vehicle 11.

Included in swivel carriage 16 is a mounting portion or casing generally indicated at 18, which is carried forwardly on carriage 16 and secured to the draft tongue portion of the carriage in front of the body of vehicle 11. Adapted to be mounted in mounting portion 18 and detachable therefrom is a tongue member 21 which is adapted to be secured at its forward end to the rear end of drawing vehicle 10 by means of a conventional coupler device.

Specifically, tongue member 21 is provided at its forward end with an eye 19 which constitutes a coupler means or portion carried by the tongue member. Eye 19 is adapted to be dropped over and connected to a pivotable finger 20 or second coupler means carried by frame structure of lead vehicle 10. In the coupler of the type illustrated, finger 20 is swung into the position shown in Fig. 2 with its forward end adjacent an abutment 20a, and then locked in this position by a suitable lock mechanism. This enables eye 19 to be loosely held about the body of finger 20. The connection made by the coupler device permits the rear end of tongue member 21 to swing freely, as would be necessary during transit of the truck-train. Various types of well-known coupler devices may be employed for securing the tongue member to vehicle 10, the specific form of coupler forming no part of this invention.

With reference now in particular to Figs. 2 and 4, mounting portion 18, which is affixed to frame structure of carriage 16, is comprised of a pair of parallel plates, upper plate 22 and lower plate 23, respectively, forming top and bottom walls for the mounting structure. These plates are spaced apart from each other by arcuate wall or guide portions 24 and 26. The plates and arcuate wall portions are affixed together in any suitable manner, as by a welding. The inner surfaces of arcuate walls 24 and 26 are concave and face each other. The inner surfaces of the plates and arcuate walls define an inclosed, elongated, ovate chamber of expanding and then diminishing cross section progressing toward the rear of the chamber, with the major axis of the chamber extending longitudinally of tongue member 21. The ends of the walls define a pair of spaced, constricted openings indicated as 27 and 28, respectively, which communicate with the chamber defined by the inner walls of the casing. The concave surfaces of the arcuate walls, which are guide surfaces, provide a continuous sweep from opening 27 to opening 28. Walls 24, 26 diverge outwardly in front of forward opening 27, thereby facilitating the insertion of one end of the tongue member into forward opening and the mounting structure. The openings are slightly larger in cross-section than the cross-section of the tongue member.

In operation, the tongue member 21 is first separated from mounting portion 18 and then coupled to one of the vehicles, in this case vehicle 10, by means of eye 19. The free end of the tongue member is free to swing in a generally horizontal plane. The lead vehicle 10 is then backed into the vicinity of trailing vehicle 11, and the rear end of the tongue member inserted into front opening 27. Continued movement of vehicle 10 toward vehicle 11 causes the tongue member to slide against one of the arcuate walls 24, 26 until the member is funneled out rear opening 28 and the parts are in an aligned position. A novel locking mechanism then secures the tongue member in the mounting portion and the vehicles are secured together for transport.

Referring now to Figs. 3, 4, 5, 6, and 7, the detachable locking mechanism is indicated generally at 31. The locking mechanism is carried in a housing or frame portion 32. A pair of locking members 34 and 35 are slidably mounted in housing 32 on either side of the tongue member when the tongue member is inserted through the lock mechanism. Locking members 34, 35 slide in a chamber defined by wall portions 36 and 37 of housing 32. Each of the wall portions has an opening formed therein to accommodate the insertion of the end of the tongue member past the locking members.

The locking members are allochiral, as may be seen in Fig. 5, each having a cutout section 38 adapted to fit around and into notches 39 (see Fig. 1) formed on either side of the rear end of the tongue member. In this way, when the locking members engage the tongue member, they positively hold the tongue member from longitudinal movement. Each of the locking members also has a shoulder 41 formed in its outer edge. A pair of compression springs 42 urge the locking members inwardly toward each other into an abutting position, as illustrated in Fig. 5. The walls of housing 32 defining the chamber holding the locking members are spaced far enough apart to accommodate lateral movement of the locking members away from the tongue member whereby the tongue member may be released from engagement with the locking member.

Projecting into the locking mechanism through the lower portion of walls 36, 37 of the housing is a release means or rod 51. This release rod is slidable to and fro and rotatable in a sleeve 52. Sleeve 52 is rotatably mounted in an aperture 49 formed in wall 37, and a bracket 50 carried by plate 23. Collars 55 secure the sleeve from axial movement. Sleeve 52 has affixed, at one of its ends, a cam member 53. The cam member is elliptic in shape, as can be seen in Fig. 5. The cam member is positioned between the locking members, and when rotated or revolved by rotation of sleeve 52, moves from the non-spreading position illustrated in Fig. 5 to the spreading position illustrated in Fig. 6. The cam member in its spreading position moves the locking members 34, 35 out of engagement with tongue member 21.

The other end of sleeve 52 has a notch 54 formed therein. Notch 54 is adapted to receive a hooked end portion 56 of rod 51 when the rod is thrust inwardly into the sleeve. When hooked end 56 is inserted into the notch, rotation of rod 51 also operates to rotative sleeve 52. Notch 54 and hooked portion 56 function as clutch means interposed between the release rod and cam member operable to connect the cam member to turn with the release rod.

Affixed to release rod 51 intermediate its ends is a flange portion 57. Flange portion 57 abuts a catch bracket or catch means 58 loosely carried on rod 51 rearwardly of flange portion 57. Bracket 58 has a pair of prongs 59 and 61, respectively, extending from its ends. These prongs project through accommodating passages formed in wall 36 into the chamber carrying locking members 34, 35. When the locking members are moved inwardly to engage the tongue member, prongs 59, 61 may be adjusted to slide past shoulders 41 in the locking members and hold the locking members in engagement with the tongue member.

Seated on the side of bracket 58 away from flange portion 57 is a compression spring 62. Spring 62 encircles rod 51 and has its other end seated on a resilient metallic strip 63. Strip 63 has a hole 64 formed in the lower end of the strip which fits about the end of rod 51. Rod 51 thus positions the lower end of the strip. The upper end of the strip is positioned outwardly from a rear wall 66 of the housing for the lock mechanism by means of a spacer bracket 67. The upper end of the strip extends through and is loosely held in an accommodating slot formed in bracket 67. When the tongue member is inserted into the locking mechanism, the upper end of strip 63 abuts the rear end of the tongue member and is pivoted about bracket 67 to the vertical position shown in Fig. 4. This compresses or energizes spring 62 which acts as a biasing means for catch bracket 58, so that the bracket is urged to the right in Figs. 3 and 4 and into holding engagement with the locking members.

Figs. 3, 4, and 5 illustrate the locking mechanism when the tongue member is assembled with the locking mechanism and locked in position. Locking members 34 and 35 are urged inwardly toward each other, under the action of springs 42, and cutout sections 38 engage the notches in the end of the tongue member. The locking members are held from spreading apart by the prongs of catch bracket 58.

Bracket 58 constitutes an adjustable catch means engaging the locking members and fixing them from lateral movement. Bracket 58 is moved out of engagement with the locking members by means of release rod 51. When release rod 51 is urged to the left in Figs. 3 and 4, flange 57 affixed to the rod moves against the center of bracket 58 moving the bracket away from the locking members and prongs 59, 61 out of engagement with the locking members.

Continued movement of the release rod places the hooked end 56 in notch 54 so that sleeve 52 may be rotated by rotating the release rod. Rotation of sleeve 52 causes cam member 53 to revolve and the ends thereof to force the locking members apart. When the locking members are moved apart, the tongue member may be removed from the locking mechanism.

After removal of the tongue member, the parts of the locking mechanism occupy the positions illustrated in Figs. 6 and 7. Spring 62 is compressed between strip 63 and flange 57. Strip 63 is pivoted to the inclined position shown in Fig. 7. If the cam member is now moved to a non-spreading position, the locking members will move together under the urging of springs 42. Catch bracket 58 is held out of engagement with the locking members by means of flange 57 and rod 51, which is held from moving to the right in Figs. 6 and 7 by the friction produced between rod 51 and tube 52, and by the bite of the edges of hole 64 on rod 51; which is similar to the bite created in the lock mechanism of a transom lock. Alternately, the compression of spring 62 may be selected so that when strip 63 is inclined, the compression of the spring is not sufficient to move catch bracket into holding engagement with the locking members.

When the tongue member is subsequently inserted into the locking mechanism, the end of the tongue member, by reason of slope surfaces 68 and 69 (see Fig. 3), wedges apart the locking members against the bias of springs 42. The locking members slide over the sides of the tongue member until notches 39 of the tongue member move adjacent the locking members, enabling the locking members to move together and to fasten onto the tongue member. In moving into this position, the end of the tongue member strikes the upper end of strip 63 and moves the strip to a vertical position. This enables spring 62 to urge catch bracket 58 to the right in Figs. 3 and 4, thereby to hold the locking members in engagement with the tongue member.

A pin 71, having a head 72 and shank portion 73, extends through bores formed in mounting portion 18 and tongue member 21 at a point spaced forwardly of locking mechanism 31. Pin 71 serves as a second locking mechanism securing the tongue member in place. The use of two spaced locking mechanisms increases the rigidity of the connection between tongue member 21 and the carriage 16 of vehicle 11.

To insure safety, tongue member 21 may be provided with an expanded end carrying slope surfaces 68, 69. That is, the width of the tongue member to the left of notches 39 in Fig. 2 may be made larger than the width of the remaining portion of the tongue member. Further, opening 28 may be constructed large enough to accommodate removal of the end of the tongue member through the opening, whereas opening 27 may be constructed so that it is slightly smaller than the expanded end of the tongue member. By such a construction, the tongue member slides in mounting portion 18, but may not be completely removed therefrom.

When coupling vehicles, the lock mechanism is released and the tongue member withdrawn partially from the mounting portion 18 carried by one of the vehicles. The free end of the tongue member is then moved into the vicinity of the coupler position carried by the other of the vehicles, and then coupled to the vehicle. The connection is then completed by moving the vehicles together forcing the tongue member along the guide walls 24 or 26 until it passes through opening 28 and is locked in position.

It is claimed and desired to secure by Letters Patent:

Draft mechanism for coupling a drawing and drawn vehicle comprising a mounting portion secured to one of said vehicles, an elongated tongue member slidably carried in said mounting portion, one end of said tongue member being connectable with the other of said vehicles to establish a draft connection between the vehicles, said mounting portion having a pair of elongated guide portions cooperating with each other and operable to move said tongue member into a predetermined angular position relative to said mounting portion when said tongue member is advanced into said mounting portion, and locking means detachably locking said tongue member in said mounting portion in said angular position, said locking means having a pair of locking members spaced to either side of said tongue member and adapted to move inwardly and engage said tongue member thereby to hold the member from longitudinal movement, a cam member interposed between said locking members and revolvable from a nonspreading to a spreading position wherein said locking members are out of engagement with said tongue member, catch means adjustable to hold said locking members in engagement with said tongue member when said cam member occupies a nonspreading position, release means connected to said catch means for releasing the latter from holding said locking members, and clutch means interposed between said release means and said cam member operable to connect said cam member and said release means.

References Cited in the file of this patent

UNITED STATES PATENTS

| | | |
|---|---|---|
| 2,151,181 | Appel | Mar. 21, 1939 |
| 2,425,309 | Ennis | Aug. 12, 1947 |
| 2,703,243 | Clark | Mar. 1, 1955 |
| 2,815,965 | Becker | Dec. 10, 1957 |

FOREIGN PATENTS

| | | |
|---|---|---|
| 453,944 | Great Britain | Sept. 26, 1936 |